United States Patent
Schilham

[19]

[11] Patent Number: 5,862,643
[45] Date of Patent: Jan. 26, 1999

[54] METHOD OF FORMING A SUPPORT FOR LOW PROFILE RAISED PANEL FLOORING

[75] Inventor: Jan J. Schilham, Leusden, Netherlands

[73] Assignee: Guilford (Delaware) Inc., Guilford, Me.

[21] Appl. No.: 949,254

[22] Filed: Oct. 13, 1997

Related U.S. Application Data

[62] Division of Ser. No. 294,441, Aug. 23, 1994, Pat. No. 5,675,950.

[51] Int. Cl.⁶ ........................................ E04B 5/43
[52] U.S. Cl. ........................ 52/745.19; 52/263; 52/660; 52/663; 52/745.2; 29/897.31
[58] Field of Search ............... 52/263, 660, 664, 52/741.15, 745.2, 745.19; 29/897.31

[56] References Cited

U.S. PATENT DOCUMENTS

| | | | |
|---|---|---|---|
| 2,377,648 | 6/1945 | Prince | 52/660 |
| 2,620,862 | 12/1952 | Hite | 52/664 |
| 4,111,585 | 9/1978 | Mascaro | 52/660 X |
| 5,418,036 | 5/1995 | Tokikawa et al. | 52/384 X |

Primary Examiner—Christopher Kent
Attorney, Agent, or Firm—John S. Pratt; Mitchell G. Stockwell; Kilpatrick Stockton LLP

[57] ABSTRACT

A raised flooring system and methods of forming components of such a system are disclosed. The present flooring system utilizes thin sheet metal, typically galvanized steel, to form a first strip having a plurality of pedestals formed in a spaced apart relation on the strip and connected via wings extending from the first strip to wings extending from a second strip, thereby forming an overall rectilinear, grid-like pattern of pedestals. The pedestals are used to maintain floor panels above a network of channels in which conduit, cables, hoses, pipe and other materials can be routed. The pedestals are punched and formed from strips of sheet metal and have an overall shape generally that of a tower supported by two legs that may have rounded edges for increased load-bearing capacity. The wings that are designed to interlock with corresponding wings from another strip may also be formed from the pedestal-bearing strips.

3 Claims, 6 Drawing Sheets

METHOD OF FORMING A SUPPORT FOR LOW PROFILE RAISED PANEL FLOORING

This application is a divisional of U.S. application Ser. No. 08/294,441, filed on Aug. 23, 1994, now U.S. Pat. No. 5,675,950.

BACKGROUND OF THE INVENTION

The present invention relates to flooring systems especially designed for facilities that house data processing equipment such as data processing centers, computer rooms, and offices where there is a false floor raised above the existing floor. Such false floors or raised panel floors typically utilize removable panels laid side-by-side upon raised support members in order to afford a free space where conduit, cables, hoses, wires and other computer interconnections can be routed.

Many false flooring systems exist, including ones that use adjustable jacks at each panel corner as a means of support. The support jacks for such systems are only located at the corners of the panels, which are usually square with sides of 500 to 600 mm. Accordingly, rigidity and mechanical stability of the floor must be achieved through the use of very thick panels, usually 30 to 40 mm thick, sometimes including a framework which transfers the load to the jacks. Due to the loss of usable height, these types of false flooring require an overall height of 150 to 200 mm, which is incompatible with low ceilings in existing buildings and requires new facilities to be built with added height. As an example, if one considers a 200 mm false floor at each level of a thirty-story building, the additional required height becomes six meters, the equivalent of two stories. Installing such a false floor in existing buildings requires the construction of ramps and steps as well as fire and soundproofing barriers. Finally, such structures are sometimes noisy and act as resonators. In any event, installing existing false floors either as part of a building renovation or in new construction, is both involved and costly.

Many other false flooring systems utilize base plates from which rise protrusions that will support a floor panel. For instance, U.S. Pat. No. 5,052,157 (the "'157 patent"), incorporated herein in its entirety by this reference, describes an excellent "Flooring System Especially Designed for Facilities Which House Data Processing Equipment." The system described in the '157 patent solves many of the problems associated with previous systems, including such problems described above. However, the '157 patent contemplates and illustrates construction of portions of the system "by heat forming or injection molding of a plastic compound such as polystyrene, polyethylene, polypropylene or ABS."

While such materials are excellent choices for the formation of the components for which they are suggested in the '157 patent, particularly in view of the complex shapes of some of those components, drawbacks are associated with the use of such materials in certain applications. First, the load-bearing capacity of a raised panel flooring structure utilizing such plastic materials is, in part, a function of the quantity and type of plastic materials utilized, and it can be difficult to achieve high load-bearing capacities with such plastic structures at acceptable costs and without undesirable weight. Additionally, although the nature of the application and the use of flame-retardant and smoke-suppression formulations and additives can make use of such plastic materials acceptably safe as construction materials, some fire codes nevertheless limit or prevent the use of plastic structures as components of raised panel flooring.

Accordingly, the assignee of the present invention developed the low profile raised panel flooring with a metal support structure described in U.S. Pat. No. 5,675,950 ('950 patent), incorporated herein in its entirety by this reference. The '950 patent discloses "thin sheet metal, typically galvanized steel, base plates laid side by side on the existing floor, on which stand-offs are attached in a rectilinear pattern to serve as supports for floor panels that form the raised or false floor and are typically covered with carpet tile." Each stand-off has "[a] tab on the end of each arm of each stand-off [that] is received with a friction fit in an opening in the baseplate, and is bent to lie against the underside of the base plate in a depression formed therein." Thus, the stand-offs may be assembled into the base plate, which can be provided with "[s] core or cutting lines . . . for breaking or to facilitate cutting it during installation."

The metal support structure disclosed in the '950 patent provides a non-combustible, enhanced load-bearing and easily assembled flooring system. However, the costs of the metal flooring system may be significantly higher than the plastic materials that are used with systems such as disclosed in the '157 patent. Obviously, the higher cost is a function of the generally more expensive metal (in terms both of costs of material and more involved manufacturing processes) that comprises the base plates and stand-offs. Moreover, the necessity of separately manufacturing base plates and stand-offs, then assembling them, adds complexity (and consequently increased cost) to the flooring system. Indeed, the assembled flooring system may also have significant weight, in the range of 10–12 kilograms per square meter of flooring. This weight, in addition to the bulk of the metal base plates, makes more difficult not only the storing and transportation of the metal base plates, but also their application to the floor to be provided with the flooring system. Moreover, in multi-floor buildings that have large areas to which a flooring system must be applied, a decrease in the weight of the flooring system is cumulatively significant and therefore desirable in order to decrease the load on the building's structure.

Furthermore, when the ultimate user assembles the base plates upon the floor, she may find it difficult properly to shape the base plates to fit odd corners or spaces remaining once the rest of the floor is covered. Although this problem is reduced by the scoring or weakening provided in the base plate, which allows some flexibility in shaping the base plate to match the area to be covered, it still slows the process of installing the flooring system in the event that the user must laboriously and carefully cut through the entire base plate to give it the appropriate shape.

Accordingly, there remains a need for a low profile raised panel flooring system using components compatible with the strictest fire codes, that can offer high load-bearing capacity, is cost effective and overcomes other disadvantages of the above systems.

SUMMARY OF THE INVENTION

The present invention utilizes strips of sheet metal, typically galvanized steel, from which are formed support pedestals that remain connected by the strip. Transversely extending from the main strip of pedestals are thin strips of material, or wings (also formed from the main strip), that are designed to interlock with wings of other main strips bearing pedestals. Interconnecting a plurality of pedestal-bearing strips together forms a module having a rectilinear, grid-like pattern of pedestals connected via strips and wings. Numerous modules can be placed over and fixed to a floor. Panels are then placed over the pedestals of the modules to provide the false floor upon which furniture and equipment will rest, and underneath of which data communication, power and other lines may be routed through the network of channels formed by the floor, pedestals and panels. The flooring system thus may be composed of metal or other non-combustible materials and is of high load-bearing capacity.

Because the strips and wings interconnecting the pedestals do not cover all of the area in between the pedestals, less material is required to build the support system, which accordingly greatly decreases the cost of the overall flooring system. Furthermore, because a flexible framework interconnects the supports, the support system will conform more closely to the surface of the floor to be covered, alleviating the difficulties associated with covering uneven floors with a rigid flooring system. The support system is lighter in weight and more easily transported, maneuvered and assembled. The lighter weight also decreases the strain on buildings in which the flooring system is installed. With a pedestal height of 55 mm, the present flooring system weighs approximately 4–5 kilograms per square meter of flooring. At a pedestal height of 85 mm, the flooring system weighs approximately 6 kilograms per square meter of flooring. This is a significant decrease in weight from other metal flooring systems.

Although lighter, the flooring system of the present invention is still extremely high in load-bearing capacity. Load-bearing capacity can be further increased by forming round corners from the edges of the legs supporting the central, top surface section of the pedestals. Such round corners provide additional structural support to the top surface section, which will be parallel to the floor and support floor panels.

Moreover, like the stand-offs described in the '157 patent and the '950 patent, pedestals of the present invention may also include a cruciform groove, which divides the top, support surface into four quadrants. Each quadrant has a screw hole and a conical depression to receive a screw passing through a corner of a floor panel that has edges turned down to better interlock with the grooves in the pedestal. The conical depression causes the hole to close, enhancing its holding power, as the screw is tightened.

Alternatively, a single screw can be inserted into floor panels that have quarter-circle cutouts in each corner that, when four floor panels are arranged adjacent one another in a grid-like pattern, together define an opening through which will pass a screw. Arms of the skirts or lips that partially surround the perimeters of the floor panels project into the opening, forming a shelf or ledge. Upon the shelf will rest a ring, into which will pass the single screw. The tip of the screw seats into a conical depression in the center of the underlying pedestal. The screw captures the projecting legs of the skirts (and thus the floor panels) between the ring and the pedestal to fasten firmly the floor panels and prevent buckling or other movement. The skirt or lip may also fit within the cruciform grooves sufficiently closely to prevent movement of the floor panels. Obviously, utilizing only a single screw to attach the floor panels to the pedestals greatly facilitates assembling the flooring system, thereby decreasing associated labor costs. Where this central screw system is used to attach the floor panels to the pedestals, the ring may be formed from copper or over conductive metal in order to interconnect electrically the flooring system.

The flooring system is provided by covering the entire floor with modules. In the strip connecting the individual pedestals are holes through which nails or screws can be inserted to hold the assembled module of strips to the floor. Alternatively, the module could be glued to the floor with an appropriate adhesive. Modules are aligned on and fixed to the floor in abutting relation along a longitudinal axis. Other modules are appropriately spaced along the other sides to accept the floor panels that will be supported by the pedestals. The modules can be connected so that electrical conductivity between adjacent modules is achieved to provide an electrical ground. Once the majority of the floor is covered with modules, it may be necessary for the user to trim the final modules to be placed in order to cover any leftover areas. Because only the relatively narrow wings and strips interconnect the pedestals within a module to one another, it has been found that scoring or cutting lines need not be formed. It is necessary only to use a pair of shears or another cutting device to trim a module to the desired shape.

After placement of the modules, a junction box can be arranged within the pedestals. The junction box may be the one described in applicant's co-pending U.S. patent application Ser. No. 08/218,373, which is hereby incorporated herein in its entirety by this reference, and may include a housing with four sides joined to form a square, with receptacles provided for outlets. The housing may be formed from sheet steel or other appropriate material so as to be held in place by contact with pedestals. The junction box acts as an interface between (1) the electrical, telecommunications, data or other service lines traveling through channels formed beneath the false floor and (2) the equipment resting upon the false floor that must connect to the one or more service lines. Various outlets within the junction box may be provided for electrical, telecommunications or data transmission lines of the flush or forward type, or the junction box may be pierced with holes for passage of lines through the junction box directly to a specific piece of equipment.

Installation of the junction box is accomplished without the necessity for fastening means, such as screws, adhesive or clamps, as the housing of the junction box is shaped to fit tightly between the pedestals that support the false floor panels above the structural floor. The housing can be comprised of a single unit or several pieces assembled into various shapes, preferably a square, all of which fit tightly between the pedestals supporting the floor panels. No special fasteners or other attachment means need be used, as frictional contact between the pedestals and the cutouts in a flange or ledge running along the top of the housing will fix the housing in place. Utilizing a housing of this construction, a junction box can be fixed between virtually any group of pedestals in the area covered by a false floor. Consequently, a flooring system for providing channels in which data, electrical, communications or other cables can be arranged and organized for access by the user is provided.

The flooring system of the present invention is formed from blank strips of galvanized steel coils. A plurality of coils are arranged together so that as the blank strips are unwound from the coils the strips maintain a parallel relationship. The blank strips are then stamped so that L-shaped cuts appropriate to form wings are made on the edges of the blank strips, and holes are formed in the four quadrants defined by the cruciform pattern that will be formed in the top of the pedestals. The rectangular shaped wings are then bent over to project at a substantially ninety degree (90°) angle from the longitudinal axis of the blank strip. Because the strips are parallel and separated at an appropriate distance, the wings will overlap one another and can then be easily stapled, clipped, welded or otherwise fastened together. The continuous, interconnected strips are then cut off at the same length to form a module and pedestals are punched and formed from the module, with a pedestal located where the holes were placed in the stamping process and between each set of wings.

The individual pedestals are formed from the blank strip by means of stamping, crushing and cutting whatever number pedestals are designed to fit onto a particular sized strip. (The density of pedestals covering the module is controlled by the spacing between pedestals and strips, which spacing is variable). Although the pedestals can be provided with the cruciform groove and holes for interfacing with floor panels, the basic supporting shape need consist only of a central support section supported over the floor by at least two legs.

It is therefore an object of the present invention to provide a support in which a plurality of pedestals with enhanced load-bearing capability can be formed from a strip.

It is yet another object of the present invention to provide a support in which a plurality of strips having pedestals formed therein are interconnected into a module via wings also formed from the strips.

It is a further object of the present invention to provide a flooring system at least portions of which are non-combustible.

It is another object of this invention to provide a flooring system in which modules of pedestals are covered with floor panels, thereby forming channels in which data, electrical or other service lines may be routed.

It is an additional object of this invention to provide a flooring system in which modules cover the floor and have at least one junction box fixed in position by the pedestals on the modules and that can be arranged in virtually any area of the floor to interface with the service lines traveling through the flooring system's channels.

It is yet another object of this invention to provide a method for creating the support structure underlying the flooring system.

Other objects, features, and advantages of the present invention will be apparent with reference to the remainder of the text and the drawings of this application.

DETAILED DESCRIPTION OF THE DRAWINGS

Figure 1:
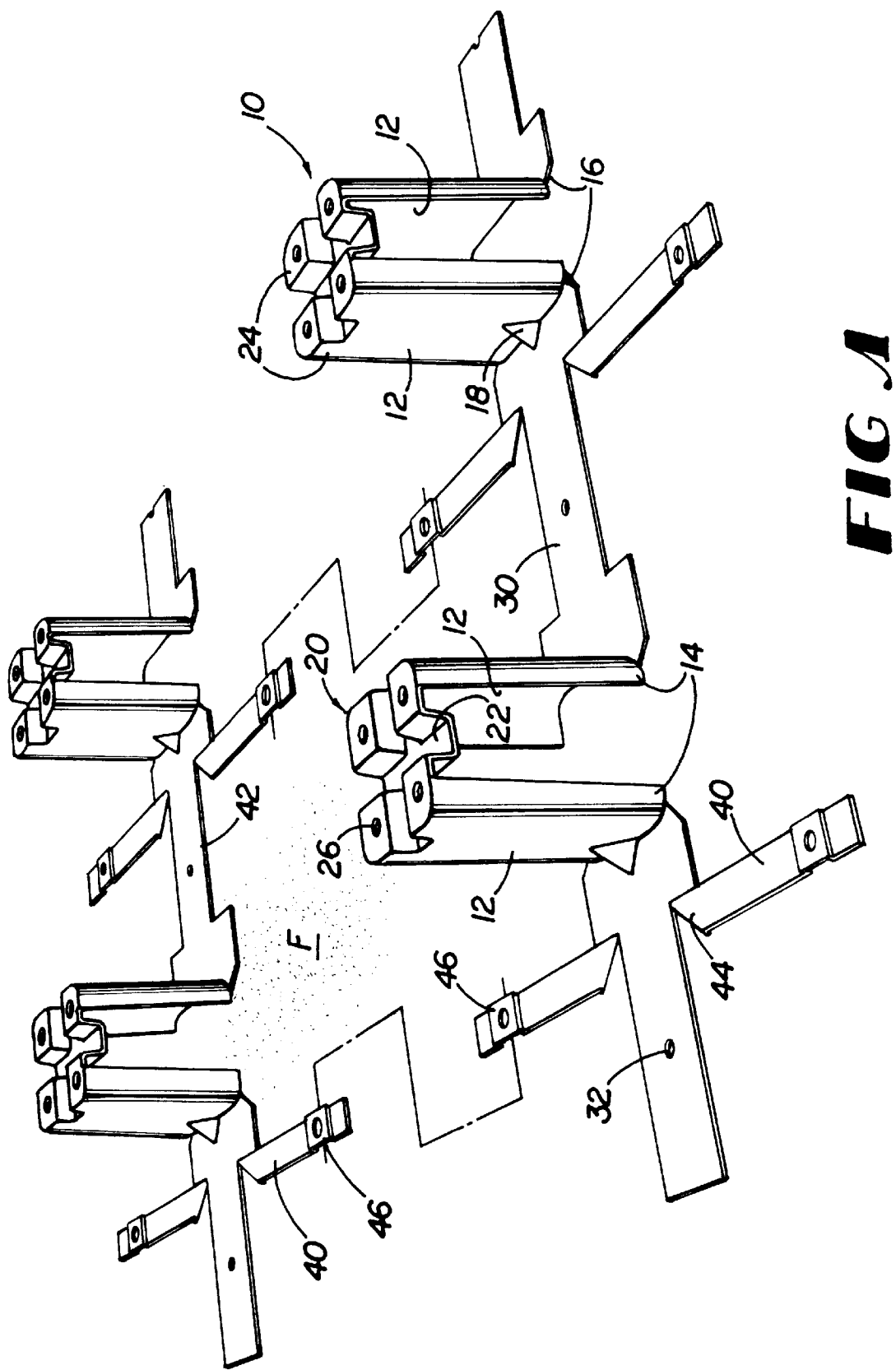
FIG. 1 is an exploded perspective view of four pedestals of the low profile raised panel flooring metal support framework of the present invention showing the way pairs of pedestals may be interconnected by wings.
Figure 6:
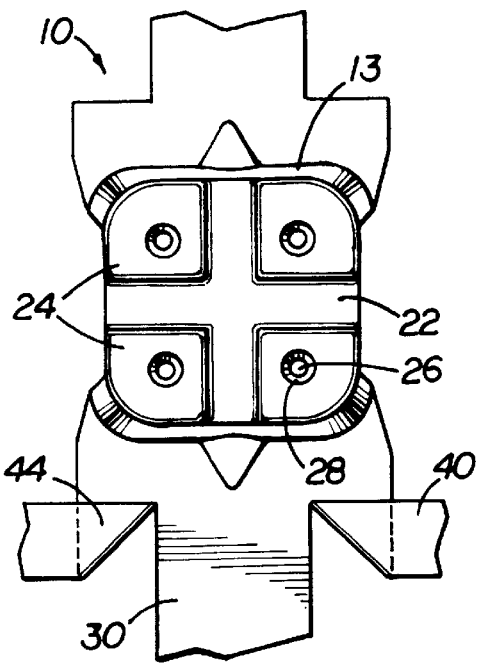
FIGS. 6 and 7 are top and side views, respectively, of the pedestal of the present invention.
Figure 7:
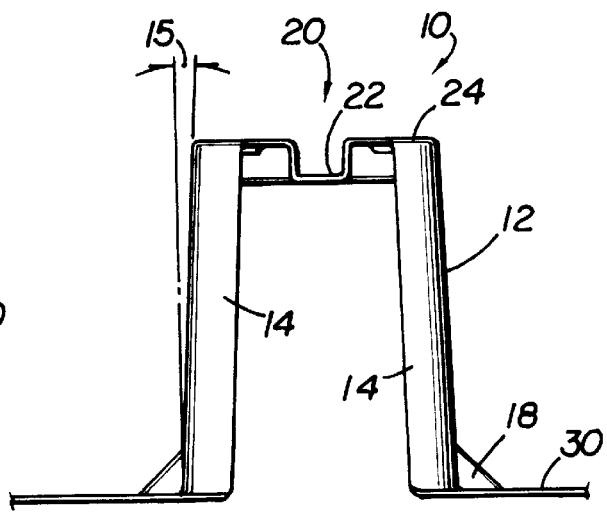

FIGS. 1, 6 and 7 illustrate an embodiment of the support pedestals 10 of the present invention. Each of the pedestals 10 have two legs 12 connecting a central section 20 to a connecting strip 30. Legs 12 have rounded corners 14 that provide additional load-bearing capacity. Rounded corners 14 may be formed from the connecting strip 30 by bending (and stretching somewhat) the edge of the connecting strip 30, leaving an angled edge 16. Additionally, the legs 12, which have first and second flares 13 and 15 from a central section 20 to the connecting strip 30, are joined with the connecting strip 30 by a pyramid shaped gusset 18 that provides further structural rigidity to the otherwise flexible materials from which the legs 12 may be formed.

Figure 3:
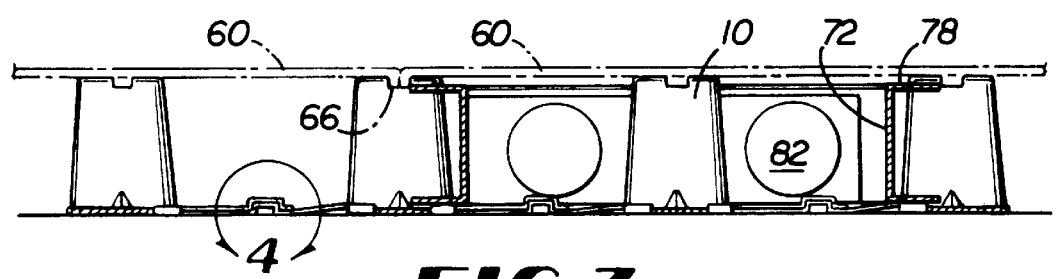
FIG. 3 is a side elevation view of a section through lines 3—3 in FIG. 2.

Legs 12 support the central section 20 that may be drawn to create a cruciform groove 22 for receiving complimentary portions of the floor panels 60, such as a continuous lip 66, which runs about the perimeter of the floor panel 60, that may interlock with the top of a pedestal 10, as shown in FIG. 3. Groove 22 also divides the central section 20 into four necks 24, each having an opening 26 in a conical depression 28 to receive a fastener. The conical depression 28 causes the opening 26 to close as a fastener, such as a screw (not shown), is tightened, thereby enhancing its ability to hold the screw (and thus a floor panel 60 through which the screw will pass and secure) in place.

Pedestals 10 are located in parallel rows and columns so as to form a series of parallel channels perpendicular to each other. Although embodiments of the pedestals 10 may be made of galvanized steel approximately 0.75 mm thick for a pedestal 10 having a height of 55 mm, other materials of other thicknesses may be used as desired. Where pedestals 10 of a different height are desirable, it may be necessary to adjust the thickness of the material or appropriately reinforce certain areas of the pedestals 10 in order to provide sufficient load-bearing capacity for the particular pedestal 10 height used. Alternatively, greater or fewer pedestals 10 may be connected via the connecting strips 30 and the wings 40 and spacing of pedestals 10 may be modified as necessary or desired. As can be readily seen from FIG. 2, adjusting the length of either the wings 40 or the connecting strip 30 changes the density of the pedestals 10 provided upon the module 50. For instance, shortening the length of the wings 40 and the connecting strips 30 increases the density (and correspondingly the overall load-bearing capacity) of the pedestal 10 upon module 50.

However, the structure of the illustrated embodiment of the pedestals 10 is such that load-bearing capacity is optimized for that particular thickness. Such structure includes the rounded corners 14 and the gusset 18 and is shown in FIGS. 1, 6 and 7. Additionally, the legs 12 have the first flare 13 that is approximately two and a half degrees (2.5°) from the central section 20 to the connecting strip 30. Corners 14 (as viewed from FIG. 7) also have an approximately one and a quarter degree (1.25°) second flare 15. The first and second flares 13 and 15 given to the legs 12 further increase the load-bearing capacity of pedestal 10 without the need for providing a thicker or stronger metal. Moreover, because connecting strip 30 is fastened to the floor F via adhesive or, alternatively, via holes 32 through which screws or nails can be driven, the connecting strip 30 resists any tendency of the legs 12 to slide outwardly when a load is placed on the central section 20.

Figure 4:
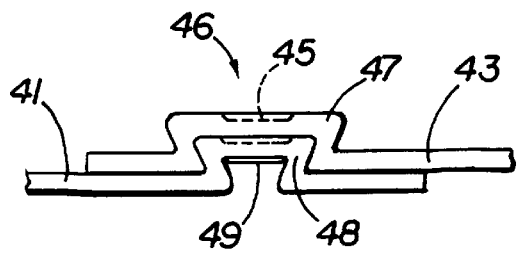
FIGS. 4 and 5 are enlarged side elevation and exploded perspective views, respectively, of the interconnection of the wings shown within circle 4 in FIG. 3.
Figure 5:
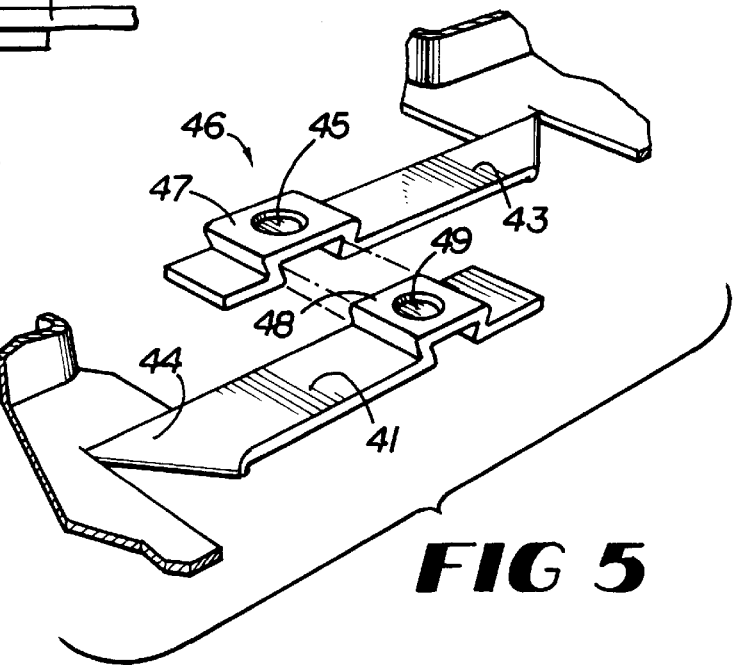

Transverse stability to the connecting strip 30 and pedestals 10 is provided by several wings 40 that protrude transversely from the connecting strip 30 and are connected with the wings 40 of a parallel strip 32 (also fastened to floor F). Wings 40 are formed from the connecting strip 30 by making an L-shaped cut 42 into the edge of the connecting strip 30. Wings 40 are then folded over to form a reinforced joint 44. Where two connecting strips 30 are placed in parallel relation and have their pedestals 10 properly aligned, the folded-over wings 40 will overlap and may then be connected via a staple 46. Details of the interconnection of the wings 40 via the staple 46 are shown in FIGS. 4 and 5. A first wing 41 is overlapped by a second wing 43. Staple 46 is then formed to join the two first and second wings 41 and 43 together. On second wing 43 is a mortise 47 in which is formed a protrusion 45. Mortise 47 fits over a dovetail 48 on first wing 41 in which is located a recess 49 that receives the matching protrusion 45 for a snap-lock fit. Staple 46 thereby firmly fixes first wing 41 to second wing 43.

Figure 2:
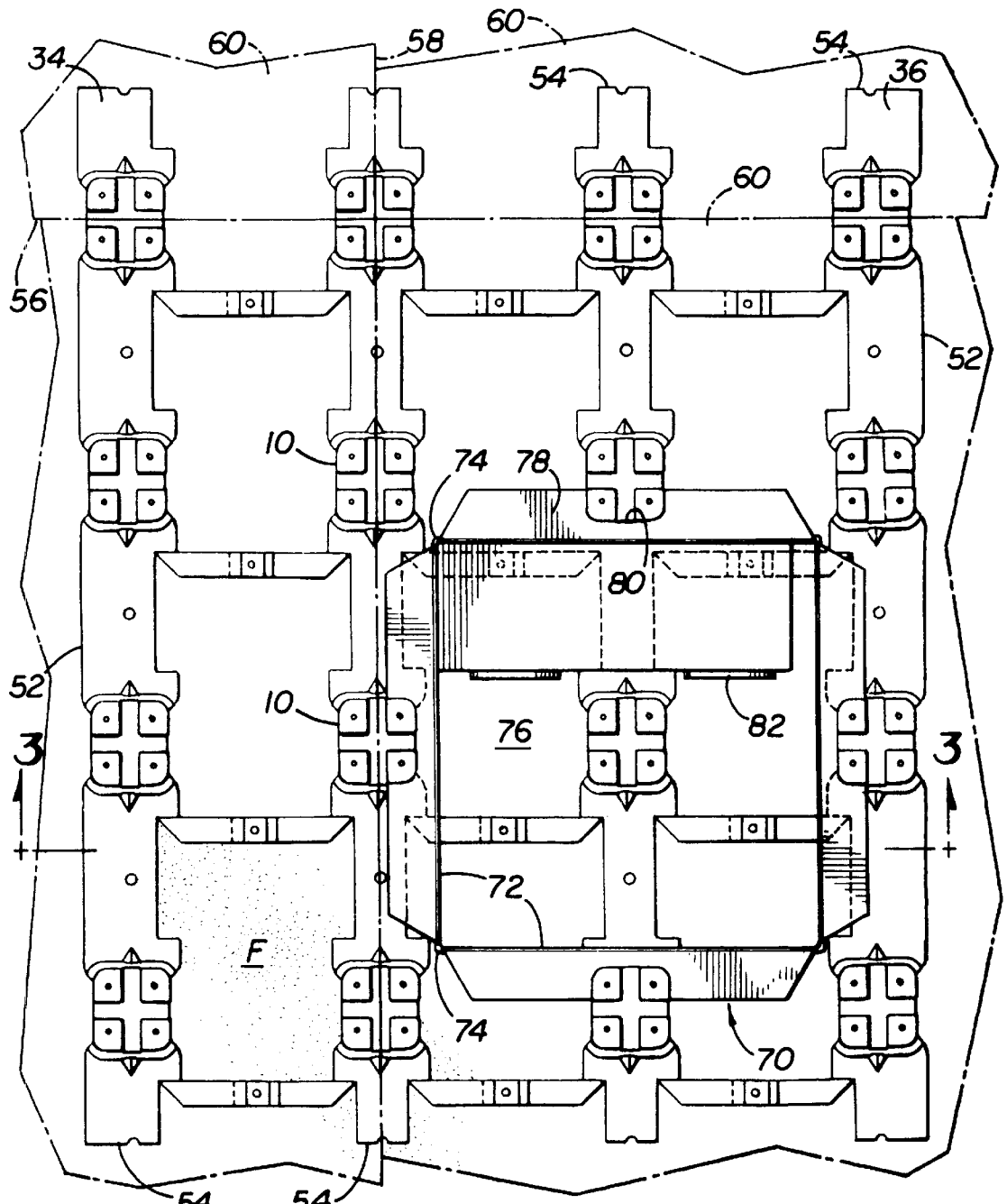
FIG. 2 is a top view of the flooring system of the present invention, illustrating a module covered by floor panels and provided with a junction box.
Figure 8:
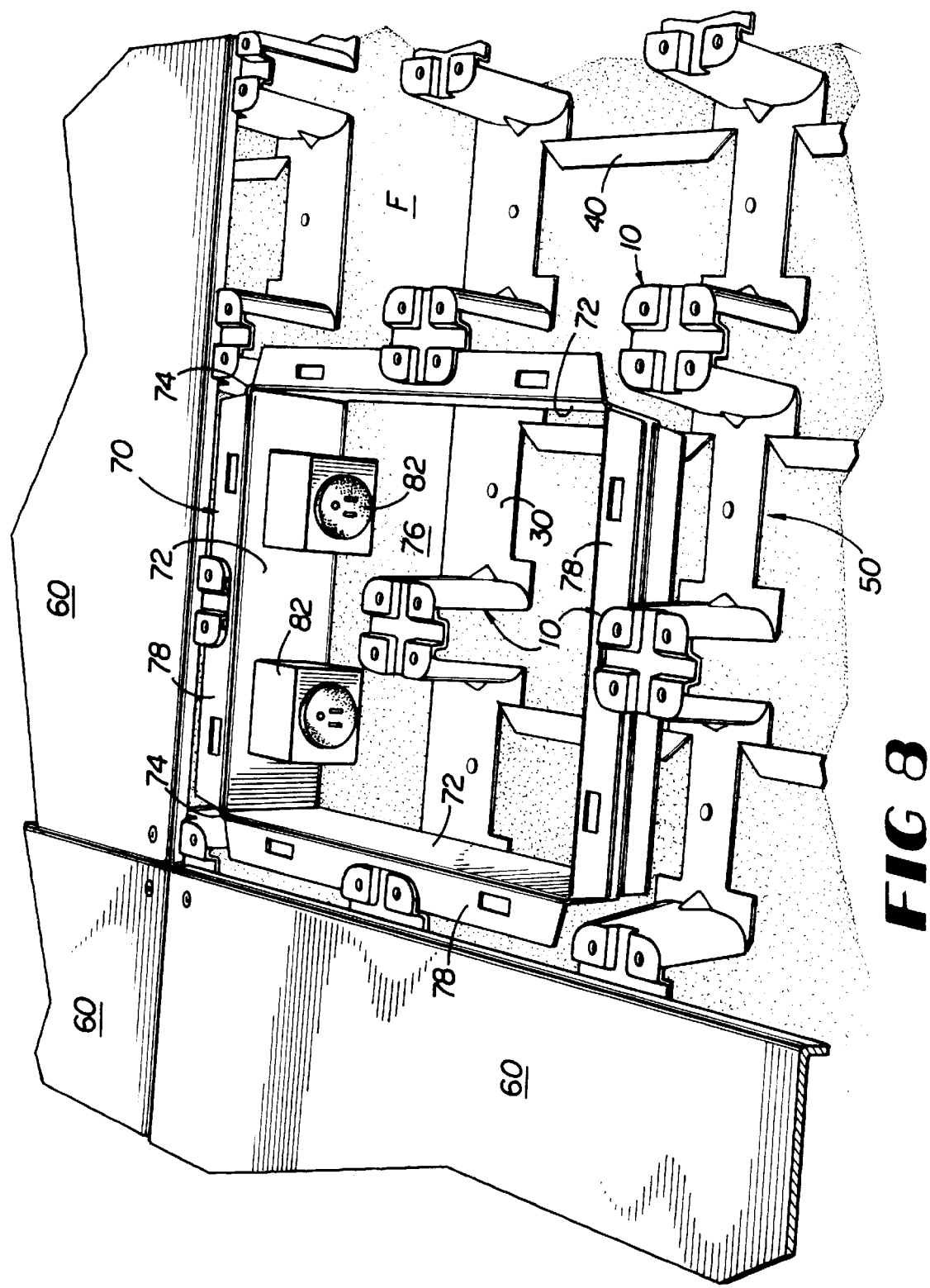
FIG. 8 is a perspective view of the flooring system of the present invention, illustrating a floor covered by several modules provided with a junction box and floor panels.

Once connected, as shown in FIGS. 2 and 8, the pedestals 10, connecting strips 30 and wings 40 will present a rectilinear grid-like appearance with the sixteen pedestals 10 arranged in a pattern of four rows and four columns. Clearly, however, the connecting strips 30 and wings 40 need not be perpendicular to each other to connect effectively pedestals 10. Any angular orientation of the connecting strips 30 and the wings 40 may be used to interconnect pedestals 10 into a module 50. In any event, the flexibility inherent in interconnecting the pedestals 10 by strips of material into the modules 50 allows the modules 50 to conform readily even to uneven areas of the floor F. Thus, noise from movement (e.g., rebounding) of the flooring system is diminished and the flooring system is easier to install.

Module 50 has first and second border strips 34, 36 that each have an edge 52 that does not form the wings 40. Thus, edges 52 and ends 54 define the boundaries of the module 50. A second, identical module can be placed so that its ends would abut against ends 54 of module 50 so that columns 58 of pedestals 10 are arranged in longitudinal fashion. Likewise, yet another module could be appropriately spaced from the edges 52 of the module 50 so that parallel rows 56 of pedestals 10 are formed, allowing the floor panels 60 to be appropriately supported by the pedestals 10 on such modules. Alternatively, first and second border strips 34, 36 could be provided with wings 40 to connect with other modules. This or a similar inter-module connection may be sufficient to connect electrically the flooring system so that the entire system can serve as an electrical ground. Floor panels 60, when composed of metal, could also provide the electrical connection between the modules 50.

FIGS. 2 and 8 illustrate a junction box 70 situated between several of the pedestals 10 of the module 50. Junction box 70 has a housing that is composed of four sides 72 meeting in ninety degree (90°) angles at corners 74 to form a square perimeter bounding open area 76. Each of the sides 72 has a top ledge 78 in which a cutout 80 is defined. Junction box 70 may be formed by stamping or otherwise forming an appropriate material, such as sheet steel, so that two of the sides 72 can be spot welded or otherwise fastened together at one of the corners 74, with the other of the corners 74 simply comprising, and the ledges 78 being formed by, bends in the material from which the junction box 70 is formed.

Junction box 70 is inserted at virtually any point on the floor between any group of pedestals 10 so that each of the cut-outs 80 contact with the top of a corresponding pedestal 10. Other fastening systems, such as a notch in the top of a pedestal 10 for engaging with the top ledge 78 or adhesive, could be used to secure the junction box 70. Secured within junction box 70 in one of the sides 72 is an outlet 82 that may interface with electrical, data, telecommunications or other service delivery lines traveling through the channels defined by the floor panels 60, the floor F and the pedestals 10. Such lines could travel not only through the channels but also between the legs 12 of pedestals 10 in order to reach the junction box 70, which thereby serves as a distribution center to which equipment scattered about the top of the floor panels 60 can interface for power or other services. The outlet 82 and the open area 76 may be accessed through an aperture, optionally provided a cover, situated in a floor panel 60.

Figure 9A:
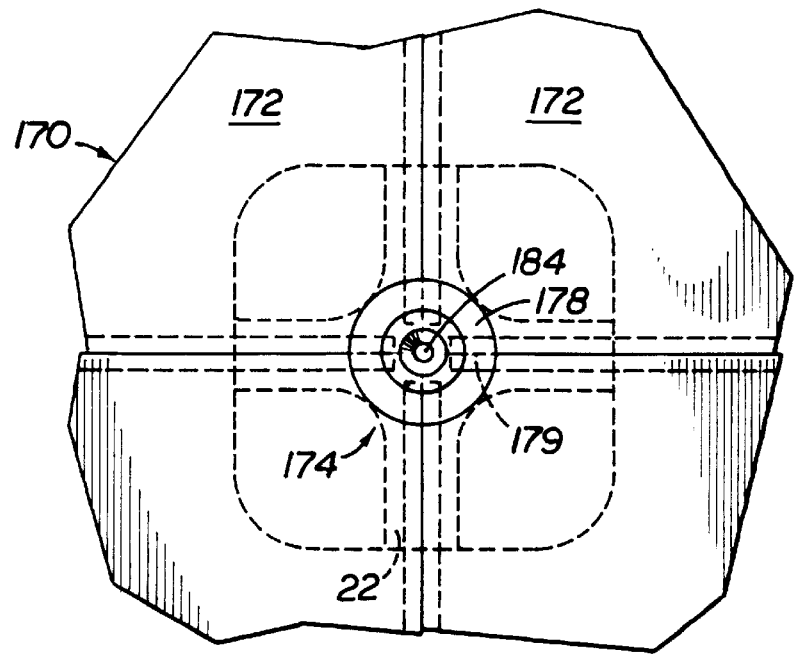
FIGS. 9A-B are top and side views, respectively, of the flooring system of the present invention provided with the central screw and ring attachment system.
Figure 9B:
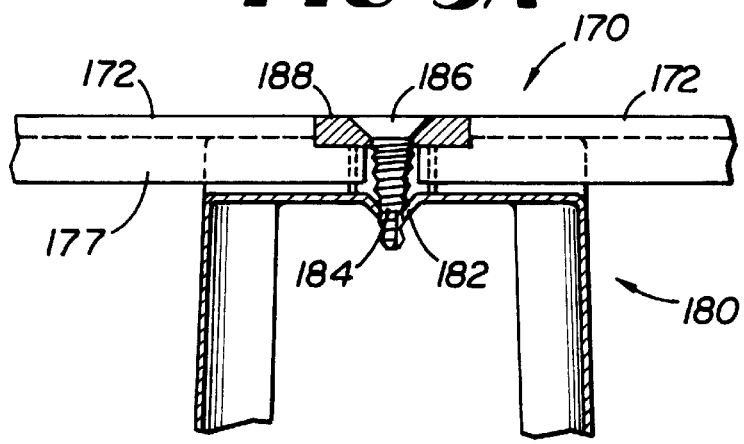
Figure 9C:
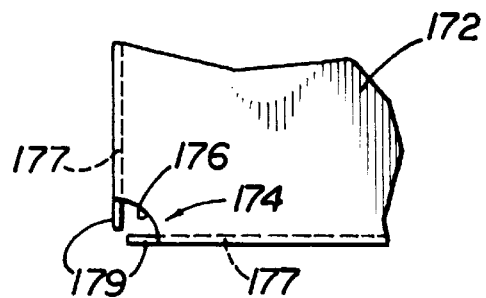
FIG. 9C is a top sectional view of a floor panel used with the flooring system shown in FIGS. 9A-B.

FIGS. 9A–C /illustrate the central screw system 170 for attaching the modified floor panels 172 to the pedestal 180 that has a conical depression 182 leading to a central screw hole 184 into which a central screw 186 may be inserted. Pedestal 180 has cruciform grooves 22 that provide a recess for accepting an interlocking skirt 177 partially surrounding the perimeter of each floor panel 172. Each corner 174 of each floor panel 172 has a quarter circle cutout 176. Each cutout 176 uncovers two projecting arms 179 of the skirt 177 that together define a shelf against which will bear a ring 188, which may be formed of an electrically conductive but malleable material, such as copper, to better conform with possible slight variations in the thickness of the arms 179 on each floor panel 172.

As shown in FIG. 9A, when the floor panels 172 are applied over the pedestals 180, the cutouts 176 together form a circular opening 178 with a shelf formed just under the top of the floor panels 172 by the arms 179 projecting into the opening 178 left by the cutouts 176. Ring 188 inserts into the opening 178 and rests upon the arms 179 projecting from the skirts 177 of the floor panels 172. Screw 186 is screwed into the ring 188 so that the tip of the screw 186 engages the central hole 184 of the pedestal 180. Conical depression 182 closes the central hole 184 to better fix the central screw 186. Central screw 186 thereby captures several floor panels 172 between a ring 188 and the top of a pedestal 180 to prevent the captured floor panels 172 from moving. Skirt 177 on each floor panel 172 may also engage the grooves 22 to secure floor panel 172.

Figure 10:
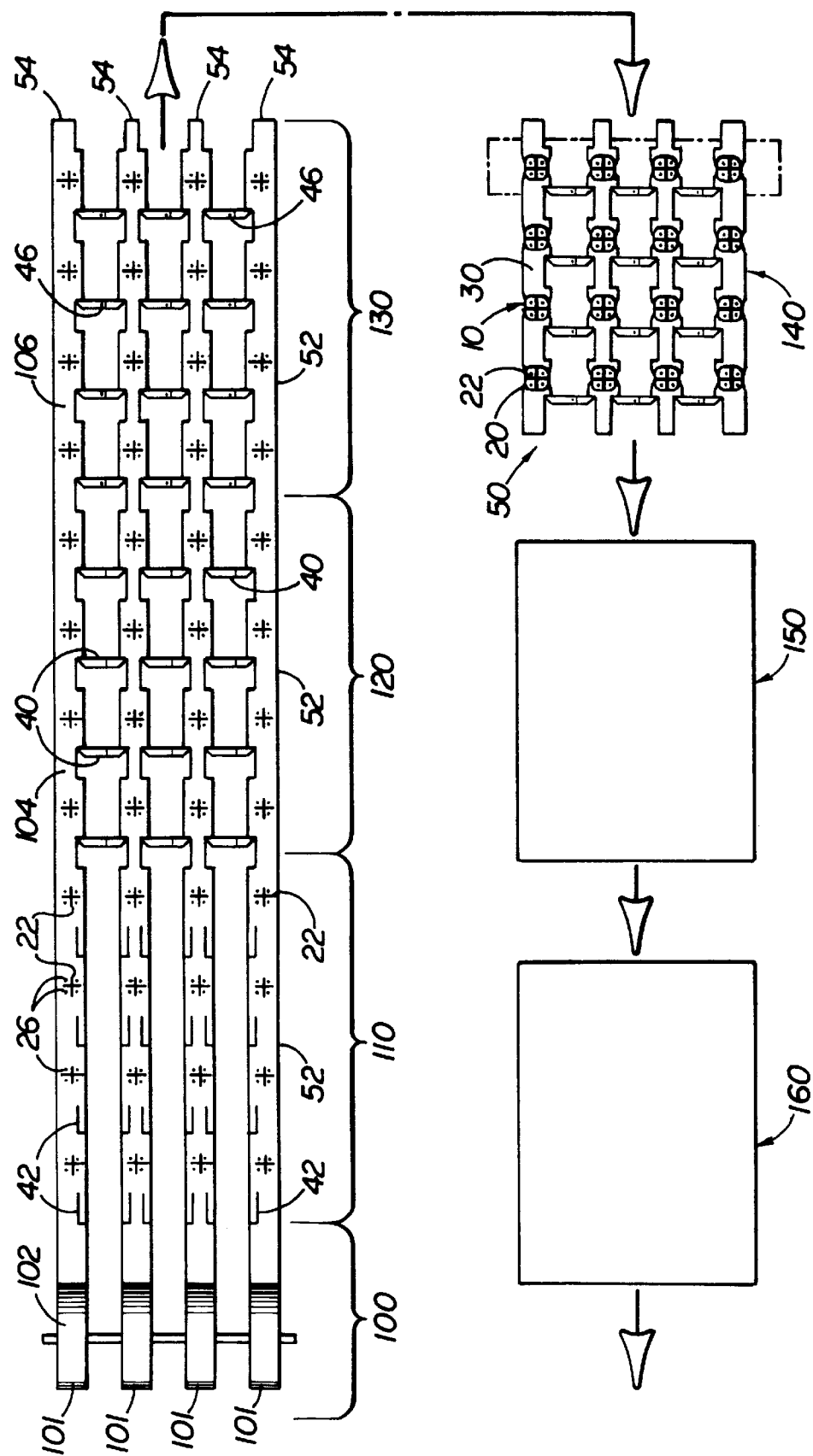
FIG. 10 is a schematic top plan view of a method of manufacturing the modules of the present invention.

A top plan view of a process for creating modules 50 is shown in FIG. 10. Starting step 100 illustrates plain strips 102 being drawn from coils 101, which may be formed of galvanized steel, in four parallel lines. At stamping step 110, the plain strips 102 are stamped with press and punch equipment situated in a hydraulic press or other appropriate machinery so as to form the L-shaped cuts 42, openings 26 and grooves 22. Edges 52 optionally may also receive L-shaped cuts 42.

Continuing along to connecting step 120, the now stamped strip 104 has the rectangular wedge formed by the L-shaped cuts 42 bent at substantially right angles to the stamped strips 104 to form the wings 40. Wings 40 overlap because the stamped strips 104 are placed in a parallel relationship and spaced apart less than the length of two of the wings 40. The overlapping wings 40 are then fastened with staple 46 during stapling step 130. One skilled in the art will recognize that numerous techniques exist for fastening together the wings 40, such as, for instance, providing a hook on each end of the wings 40 that will snap-lock together. Alternatively, a splice formed of nylon or other appropriate material may be used to interconnect the wings 40 whose ends may be provided with ribs to engage more firmly (but adjustably) the splice. However, the staple 46 shown in FIGS. 3, 4 and 5 offers several advantages including the reliable bond it provides between the wings 40.

Directly following the stapling of the wings 40 together, the continuous stamped and stapled strips 106 are cut off at ends 54 to the appropriate length depending on the number of pedestals 10 desired to be stamped into the ultimate module 50 or the desired size of the module 50. Pedestal stamping step 140 then forms pedestals 10, which are stamped row-by-row, in the areas where grooves 22 and openings 26 were created in stamping step 110. Once the pedestal stamping step 140 is complete, a fully formed module 50 has been produced and is ready for stacking at step 150 and packing at step 160. Elimination of a baseplate in favor of interconnecting the supporting pedestals 10 via strips of material creates significant savings in material. Additionally, where the pedestals 10 are formed from the same blank strip from which are formed the interconnecting strips (e.g., the connecting strips 30 and wings 40), the process of forming the flooring system of the present invention is greatly simplified at corresponding cost savings.

Alternative methods exist for creating the support for the flooring system of the present invention. For instance, pedestals 10 could first be formed on the blank strips 102. Wings 40 could then be formed by making the desired L-shaped cuts 42 and bending over the resulting rectangular wedges to form the wings 40. A plurality of connecting strips 30, each having a series of pedestals 10 and wings 40, could then be interconnected and cut to form the module 50. Alternatively, other material than wings 40 could be used to interconnect the plurality of connecting strips 30 into a module 50.

The foregoing is, however, provided for purposes of illustrating, explaining, and describing embodiments of the present invention. Modifications and adaptations to these embodiments will be apparent to those skilled in the art and may be made without departing from the scope or spirit of the invention.

What is claimed is:

1. A method of forming a support comprising the steps of:
   a. forming a plurality of support bearing strips each having two longitudinal sides;
   b. attaching the plurality of strips together; and
   c. forming from each strip a plurality of stabilizing arms protruding transversely from the longitudinal sides of the strips.

2. A method of forming a support comprising the steps of:
   a. forming a plurality of support bearing strips;
   b. attaching the plurality of strips together; and
   c. forming two grooves in the shape of a cruciform in each strip.

3. A method of forming a support comprising the steps of:
   a. forming a plurality of support bearing strips having two longitudinal sides;
   b. forming two grooves in the shape of a cruciform in each strip:
   c. forming from each strip a plurality of stabilizing arms protruding transversely from the longitudinal sides of the strips: and
   d. attaching the plurality of strips together by connecting the stabilizing arms of a first strip with a second strip.

* * * * *